UNITED STATES PATENT OFFICE 2,046,986

STABILIZED BUTADIENE DERIVATIVES

Herbert A. Winkelmann, Chicago, Ill., assignor to Marbo Products Corporation, Chicago, Ill., a corporation of Delaware No Drawing. Application March 18, 1935, Serial No. 11,665

19 Claims. (Cl. 106—23)

This invention relates to halogenated butadiene polymer bodies, including hydrohalogenated butadiene polymer bodies. More particularly it relates to the milling of halogenated butadiene polymer bodies and compositions containing them. One form of the invention is a composition containing amorphous rubber hydrochloride and a basic stabilizing material such as magnesium oxide which retards decomposition of the rubber hydrochloride during the milling treatment. The invention includes products made from the compositions. Among the products are molded masses, flexible sheets and coated objects. The preferred product is a transparent wrapping paper.

Butadiene derivatives such as rubber are unsaturated hydrocarbons and as such are capable of reacting additively with various substances which attach themselves at the double bonds of the molecule. Rubber, for example, is generally considered as a straight chain hydrocarbon, having the empirical formula $(C_5H_8)_x$ and the nuclear formula:

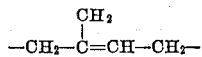

When rubber is saturated with hydrogen chloride the empirical formula is apparently changed from $(C_5H_8)_x$ to $(C_5H_9Cl)_x$. It has been found that hydrogen halides, including hydrogen chloride, hydrogen bromide and hydrogen iodide, may react additively to the rubber molecule to form either amorphous asymmetrical compounds or crystalline symmetrical compounds whose respective physical properties vary greatly. It is believed that the crystalline symmetrical hydrochloride compound has the following nuclear formula:

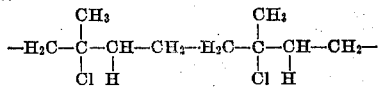

and that the amorphous asymmetrical rubber hydrochloride compound is as follows:

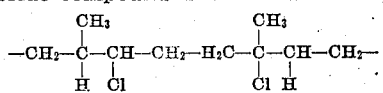

The amorphous reaction product of rubber and hydrogen chloride is preferably made by the method described in Gebauer-Fuelnegg Patent No. 1,989,396. It has been found that this amorphous product is produced by the reaction of hydrogen halides at low temperatures, and especially liquefied hydrogen chloride at or about atmospheric pressure upon polymerized butadiene bodies such as rubber. On the other hand, the crystalline reaction product of hydrogen halide and rubber is produced by passing gaseous hydrogen halides through a rubber solution at ordinary temperature as described in various publications such as Bradley and McGavack Patent No. 1,519,659, and Calvert Patent No. 1,989,632.

Rubber may not only react with hydrogen halide, but also may react with halogen both by addition to the double bonds and by substitution of the hydrogen atom by halogen. Rubber chlorides and chlorinated rubber hydrochlorides may be produced.

Polymerized butadiene halides and hydrohalides such as rubber hydrohalides and particularly the crystalline, symmetrical compounds possess the disadvantage that they readily decompose and disintegrate under the action of mechanical treatment and heat. Attempts to mill rubber hydrochloride alone and under ordinary milling conditions result in the material rapidly decomposing and crumbling. Thin films made from such milled material are dark colored, flabby and otherwise unsatisfactory for wrapping purposes. Molded mass made from rubber hydrochloride were also dark colored and considerably decomposed. Although the French patent to Peachey, No. 480,904, describes the hot rolling and molding of masses of rubber chloride compounds, such treatment of rubber chloride and hydrochlorides, and especially of the then known crystalline, symmetrical compounds, results in considerable decomposition and discoloration of the product. As far as is known by applicant, up to the present invention, light colored, substantially undecomposed masses have been made solely by casting solutions of rubber hydrochloride or rubber chloride and allowing the solvent to evaporate.

It is an object of the present invention to stabilize polymerized butadiene derivatives subject to disintegration by heat and mechanical treatment, such as rubber hydrochloride, in such a manner that they can be readily treated in a mixing mill and blended with various ingredients in typical rubber compounds.

It is a further object of this invention to stabilize rubber hydrochlorides with a material having a refractive index similar to the rubber hydrochloride so that transparent products may be produced therefrom.

Another object is to produce transparent material, including wrapping sheets, from polymerized butadiene derivatives without the use of a solvent and its subsequent evaporation.

Other and further objects will become apparent on reading the specification.

In the present invention polymerized butadiene halides and hydrohalides, in particular rubber hydrochlorides, and preferably the amorphous, asymmetrical rubber hydrochlorides, are mixed with the materials which retard their decomposition and disintegration under heat and mechanical treatment. Preferably a solid basic material such as magnesium oxide is used. The stabilized composition alone, or mixed with other ingredients, may be milled in a milling machine and rolled or molded into various articles of manufacture.

The use of basic stabilizing compounds, such as magnesium oxide with halogenated butadiene bodies such as rubber hydrochloride, makes possible the vigorous mechanical treatment of such compounds and their blending with plasticizers and other ingredients in a rubber mill without disintegration and material decomposition or discoloration. By the use of magnesium oxide with rubber hydrochloride it is possible to produce clear, transparent, self-sustaining sheets of .001" thickness, and light colored masses without the use of solvents and the consequent expense due to handling and evaporation losses.

The following procedure will illustrate the invention; it is to be understood, however, that the invention is not limited to any of the specific details or proportions given but such are merely examples of a preferred embodiment:

The product obtained by reacting rubber with liquefied hydrogen chloride which product is essentially amorphous, asymmetrical rubber hydrochloride is placed in a mixing mill and magnesium oxide is added to it as soon as possible after the product is wrapped around the mixing roll. The rolls are preferably warm at the start and need not be kept cool during the mixing operation.

During the first stage of the milling operation an age retarder of the type commonly used for rubber such as amylamine, hexamethylene tetramine, phenyl beta naphthylamine is added. Such material and particularly powdered age retarder such as hexamethylene tetramine may be mixed, if desired, with the magnesium oxide and added with it, or it may be added during the first stages of the milling and part during the latter stages. Plasticizers such as dibutyl phthalate, butyl stearate may be added. Also during the milling rosin, sulphur, rubber, duprene and the like may be admixed. After thoroughly milling the homogeneous composition may be rolled into thin sheets alone or in conjunction with other sheet material, or it may be molded by heat and pressure into various shapes. For the production of a relatively hard but tough type of product the milled composition is rolled or molded without sufficient temperature or time of heat treatment to bring about any vulcanization reaction. Such treatment is called cold rolling or molding, as the temperature generally does not greatly exceed 200° F., and the molded composition is removed from the mold after only a short period of time of about three minutes or less. Different products are obtained by heating the milled composition containing magnesium oxide a sufficient time of about 40 minutes, and at a sufficient temperature of around, for example, 300° F. to bring about the vulcanization of the rubber hydrohalide by the magnesium oxide. Rosin and a small amount of sulphur are preferably used with the magnesium oxide. The preparation of such products containing sulfur is disclosed and claimed in my co-pending application, Serial No. 22,431, filed May 20, 1935.

The following formulae are given as illustrative examples: For the production of transparent, self-sustaining wrapping paper without the use of solvents the following formula may be used:

| | Parts by weight |
|---|---|
| Reaction product of liquefied hydrogen chloride with rubber | 100 |
| Magnesium oxide | 3 |
| Hexamethylene tetramine | 2 |
| Butyl stearate | 5 |
| Paraffin | 0.5 |
| Petrol blue | .005 |

In place of the reaction product of liquefied hydrogen chloride with rubber, other amorphous rubber hydrochlorides may be used, and also crystalline rubber hydrochloride and mixtures of the amorphous and crystalline compound. The magnesium oxide in this formula may be varied from about 2 parts to about 20 parts. As the proportion goes beyond 20 parts a hiding or pigmenting effect of the magnesium oxide becomes apparent, the wrapping sheets passing from transparent and semi-transparent condition to opaque. As the proportion of magnesium oxide goes below 2 parts, decomposition of the rubber hydrochloride increases, resulting in the color of the sheets becoming increasingly darker. The hexamethylene tetramine used in the formula is preferred but any age retarder and antioxidant may be used which does not react with the rubber hydrochloride to give dark colored reaction products. Furthermore, the age retarder is not essential in the formula, self-sustaining transparent sheets being obtained without its use. The butyl stearate is also the preferred plasticizer, but other plasticizers for rubber hydrochloride may be used such as those listed below, which do not give colored sheets. The plasticizers may be left out of the formula but for commercial permanently flexible wrapping sheets it should be used. The paraffin given in the formula is not essential, being used to give a gloss to the sheet. The petrol blue or other blue dye is used to overcome the slight amber tinge of the rubber hydrochloride, thus improving the transparency of the sheet in that it allows colored objects to be seen through the sheet in more nearly their true colors.

The formula is compounded by milling in a mixing mill. The milled sheet has essentially the same formula except for a slight decrease in the amount of magnesium oxide due to the reaction with hydrogen chloride to produce magnesium chloride, which may be washed out of the milled sheet if desired.

In order to obtain transparent self-sustaining wrapping paper the stabilized mill sheet is run through calender rolls, preferably heated at around 170° F., and rolled to a thickness of approximately .001". The preferred thickness for wrapping paper is .0009–.0012" but by the use of plasticizers, flexible sheets may be obtained even in ⅞" thickness. Substantial high pressures are necessary to obtain thin sheets.

Transparent self-sustaining wrapping paper may also be produced by the following formula:

| | Parts by weight |
|---|---|
| Rubber hydrochloride | 100 |
| Sodium carbonate | 3 |
| Hexamethylene tetramine | 2 |
| Butyl stearate | 5 |
| Petrol blue | .005 |

The sodium carbonate may be readily washed out of the milled sheets before molding or rolling into thin sheets.

Transparent and semi-transparent sheets and molded masses may also be obtained by the use of many other stabilizing materials as shown by the following tables. In all cases, except when otherwise indicated, the formula used was:

| | |
|---|---|
| Amorphous rubber hydrochloride | 100 |
| Butyl stearate | 5 |
| Paraffin | 0.5 |
| Petrol blue | .0025 |
| Stabilizer | 3 |
| Hexamethylene tetramine | 2 |

TABLE 1

CLASSIFICATION OF CALENDERED SHEETS (Thickness .035–.05 inch)

Class #1. Light gray, translucent
  Calcium oxide
  Strontium oxide
  Barium carbonate
  Barium mono-oxide
  Sodium carbonate
  Magnesium oxide
  Magnesium oxide (no hexa)
  Guanidine carbonate Class #2. Light amber, translucent
  Strontium carbonate
  Calcium carbonate
  Barium dioxide
  Di-benzylamine
  Magnesium carbonate Class #3. Amber, translucent
  Calcium oxide (no hexa)
  Diphenyl guanidine phthalate
  Amylamine Class #4. Light greenish yellow, translucent
  Aluminum oxide
  Barium hydroxide
  Hexa methylene tetramine Class #5. Dark amber, translucent
  Guanidine carbonate
  Diphenylethylene diamine Class #6. Dark reddish amber, translucent
  Strontium carbonate (no hexa)
  Strontium oxide (no hexa)
  Aluminum oxide (no hexa)
  Benzalamino phenol
  Benzylamine
  Benzylamino phenol Class #7. Dark grayish amber, translucent
  Sodium carbonate (no hexa)
  Barium mono oxide (no hexa)
  Barium hydroxide (no hexa)
  Amylamine (no hexa)
  Guantol (no hexa)
  Diphenyl guanidine phthalate (no hexa)

Class #8. Light green, translucent
  Tetra methyl diamino diphenyl methane
  Nickel oxide Class #9. Dark green, slightly translucent
  diphenyl amine Class #10. Dark red, nearly opaque
  Zinc oxide Class #11. Black, nearly opaque
  Red oxide (iron oxide)
  Cobaltic oxide Class #12. Pigments, nearly opaque
  Titanium oxide
  Tin oxide
  Antimony oxide
  Lead oxide (litharge)

TABLE 2

(Molded sheets at 220° F. for 3 minutes)

(A) TRANSLUCENT OR SEMI-TRANSLUCENT SHEETS OF 1/16" THICKNESS AND TRANSPARENT AT .005" ARRANGED ACCORDING TO THEIR LIGHTNESS IN COLOR AND CLEARNESS.

Class #1. Light amber
  Magnesium oxide
  Magnesium oxide (no hexa)
  Sodium carbonate Class #2. Greenish amber
  Guanidine carbonate
  Barium mono-oxide
  Magnesium carbonate
  Calcium oxide Class #3. Amber
  Aluminum oxide
  Hexamethylene tetramine Class #4. Dark amber
  Strontium oxide
  Strontium carbonate
  Barium dioxide
  Calcium carbonate
  Barium hydroxide
  Dibenzyl aniline Class #5. Dark reddish amber
  Sodium carbonate (no hexa)
  Amylamine
  Benzalamino phenol
  Calcium oxide (no hexa)

(B) OPAQUE OR NEARLY OPAQUE SHEETS OF 1/16" THICKNESS, BUT TRANSPARENT OR SEMI-TRANSPARENT AT .005" THICKNESS.

Class #6. Light grayish green
  Tin oxide
  Dibenzyl-amine

Class #7. Green
  Barium carbonate
  Tetramethyl diamino diphenyl methane

Class #9. Brown
  Antimony oxide
  Diphenylethylene diamine
  Benzyl amine
  Diphenyl guanidine phthalate Class #10. Yellowish brown
  Benzylaminophenol (only slightly translucent at .005")

Class #11. Dark green
  Cobalt oxide
  Diphenyl amine

Class #12. Dark brown to black
  Strontium oxide (no hexa)
  Strontium carbonate (no hexa)
  Barium hydroxide (no hexa)
  Barium monoxide (no hexa)
  Amylamine (no hexa)
  Aluminum oxide (no hexa)
  Diphenyl guanidine phthalate (no hexa)

(C) NEARLY OPAQUE EVEN AT .005" THICKNESS

Class #13. Black
  Zinc oxide

Class #14. White
  Titanium oxide

From the point of view of amount of hydrogen chloride gas given off during the milling, all the material when used in proportions of 3 parts stabilizer to 100 parts rubber hydrochloride, gave off considerable gas with the exception of magnesium oxide, with and without hexamethylene tetramine, where the gas evolution was very slight, and calcium oxide with two parts hexa in which cases the gas evolution was slight. The stabilizing action of the materials is evidenced best by the fact that coloration of the sheets is much lighter than when rubber hydrochloride is milled alone.

The following formula, which may be used for cold molding and also for curing or vulcanizing, was compounded in a milling machine:

| | |
|---|---|
| Rubber hydrochloride | 100 |
| Rosin | 10 |
| Age retarder | 2 |
| Sulphur | 1 |
| Variable | 10 |

The compositions of the foregoing formula containing magnesium oxide, calcium oxide, magnesium carbonate and lead oxide (litharge) give off very little gas during the milling. Magnesium oxide and lead oxide give flexible and tough sheets. From the point of view of lightness in color the best stabilizers, in proportion of 10 parts stabilizer to 100 parts of rubber hydrochloride are calcium oxide, magnesium oxide, magnesium carbonate, sodium carbonate, barium mono-oxide, lead oxide. Calcium carbonate, strontium carbonate, strontium oxide, aluminum oxide give chocolate colored molded masses. Zinc oxide gives a black mass in large or small proportions.

In general, stabilizers are materials which retard the decomposition of the rubber hydrochloride, the formation of dark colored decomposition products, and the crumbling or disintegration of the rubber hydrochloride during the milling.

The exact theory of the action of the stabilizing materials is not known, but they seem to retard the chemical and mechanical decomposition of the rubber hydrochloride as well as neutralizing any free hydrochloric acid; probably thermal conductivity and heats of reaction and blending power are factors. Possibly also a slight vulcanizing action takes place with magnesium oxide and similar materials. Solid, powdered materials in general give better results than liquids; also when transparency is desired the use of a stabilizing material such as magnesium oxide, having a similar index of refraction as rubber hydrochloride, is helpful.

It is evident that the preferred material from the point of view of giving colorless transparent, self-sustaining sheets and in preventing decomposition of the rubber hydrochloride is magnesium oxide.

Sheets made with magnesium oxide are considerably superior to sheets made with other stabilizers from the point of view of toughness, hardness and transparency. However, sheets made with lead oxide also have the quality of toughness, hardness and flexibility, and in thickness suitable for wrapping purposes the milled sheets of rubber hydrochloride containing lead oxide are transparent, although not as clear as when magnesium oxide is used.

For the production of transparent or semi-transparent masses, the use of amorphous rubber hydrochloride made by treating rubber with liquefied hydrogen chloride is preferred. Bleached and purified rubber hydrochloride is preferred. The rubber hydrochloride itself may be bleached with hydrogen peroxide or chlorine water, or the rubber may be so bleached. Also the rubber may be made from centrifuged latex. However, rubber chloride and hydrochlorides made from vulcanized rubber, reclaimed rubber and scrap rubber may be used in this invention. Furthermore, the rubber halogen compound may be saturated or partially saturated.

In all cases where amorphous asymmetrical rubber hydrochloride is called for, the crystalline rubber hydrohalide may also be used with less satisfactory results, due to the greater tendency of the crystalline symmetrical compound to decompose, and due to its lesser inherent flexibility and strength. Rubber halides may also be used, but such materials are even less flexible than crystalline rubber hydrochloride, and many plasticizers which will give good results with the amorphous compound either will not have any softening effect on rubber chloride, or must be used in such large proportions as to be uneconomical. However, for some uses rubber chloride may be milled with stabilizers and preferably along with plasticizers to give compositions of value particularly for molding purposes. Chlorinated rubber hydrochloride and particularly the additively chlorinated rubber hydrochloride may be used.

Many materials have been found suitable for plasticizing rubber halogen compounds. Some are good plasticizers for amorphous rubber hydrochloride but not for the crystalline material. Many are good plasticizers for both the crystalline and amorphous rubber hydrochloride but have little or no effect on rubber chloride.

In general, and particularly for rubber hydrochlorides the materials listed below give a softening effect. The following materials, when added to amorphous rubber hydrochloride in proportion of approximately 5 parts to 100 parts of amorphous rubber hydrochloride, give a flexible product which, when it contains stabilizers, is suitable for milling in thick sheet form, and may be rolled into thin, flexible, transparent sheets suitable for wrapping purposes: butyl stearate, amyl benzene, butyl oleate, dibutyl phthalate. Of these materials butyl stearate is the best plasticizer, amyl benzene nearly as good. Butyl oleate and dibutyl phthalate are preferably used in about 7.5 parts–10 parts.

The following additional materials when added to amorphous rubber hydrochloride in proportion to about 10 parts to 100 parts of amorphous rubber hydrochloride, give a suitable product for milling in thick sheet form with stabilizers, and may be rolled into flexible, transparent sheets suitable for wrapping purposes. Halowax oil #1000 and 1012, Santicizer #8 (mixture of ortho and para-toluene ethyl sulfonanides), Stand Oil (non drying), pentaphene (tertiary phenyl acetate), Reogen (sulfonated mineral oil), technical white oil, #70 white oil, Puritan extra light, puropale extra light, poco petrolatum #8, Western Red Oil, Paroil #20 and #25, Dekoil, Amyl Lactate, Methyl Hexyl Ketone, Mineral Seal Oil, Transformer Oil and Mineral Oil A from Pure Oil Company. Halowax Oil, Paroil and Dekoil are chlorinated paraffins which, in general, are good plasticizers.

The function of the plasticizer is not only to insure a permanently flexible sheet but also is of importance in softening the rubber hydrochloride during the milling so that the temperature of the milling will remain low. However, in the production of molded articles it is preferable not to use plasticizers but instead hardeners may be added such as glycerol abietate, hexachlorethane and abietic acid. With no plasticizers the temperature of milling increases and the discoloration of the mass due to decomposition is enhanced. Magnesium oxide even without plasticizers and used in small amounts will give light colored translucent sheets of 1/16 inch thickness.

In addition to the incorporation of plasticizers, it is preferable to add certain age retarders as have been found satisfactory for rubber hydrochloride compositions. Among these are amylamine, hexamethylene tetramine, phenyl beta napthylamine, para hydroxydiphenyl, hydroquinone, para aminophenol, p.p'-diaminodiphenylmethane, 2,4-meta toluylene diamine, diphenyl amine, o and p ditolylamines, phenyl-alphanapthylamine, phenyl-beta-naphthylnitrosoamine, symmetrical diphenyldiamino-ethane, 2,4-diaminodiphenylamine and condensation products of aniline with acetaldehyde, or alpha-naphthylamine with aldol, of aniline with acetone, of diphenyl amine with acetone. For the production of a transparent sheet colorless material should be chosen such as symmetrical dibeta-naphthylpara-phenylenediamine, and hexamethylene tetramine. Although many of the age retarders and particularly the hexamethylene tetramine have a stabilizing action of themselves, their main use is in conjunction with inorganic stabilizers, particularly magnesium oxide.

In some of the formulae resins such as rosin are used with stabilized rubber hydrochloride. This is of particular value when used in products which are to be cured or vulcanized, as described in my co-pending application, Serial No. 22,431, filed May 20, 1935. Also the addition of rosin and similar resins with magnesium oxide or other stabilizers at the start of the milling helps to keep the rubber hydrochloride from crumbling. Under the influence of heat the rosin becomes sticky and binds the materials together. Furthermore, rosin is of value in increasing the hardness of the rubber hydrochloride compositions.

During the milling operation, rubber, Duprene, poly-rubbers and the like may be incorporated with rubber hydrochloride.

The process of milling rubber hydrochloride masses with stabilizers such as magnesium oxide is also of great value in incorporation of materials insoluble in ordinary solvents for rubber or rubber hydrochloride. Inorganic and organic materials such as pigments, finely divided metals, silica, asbestos, clay, whiting, barytes, blanc fixe, channel carbon blacks, lamp black, soft carbon blacks such as Gastex, Furmonex, Thermex, ground cellulose, flocculent material, wood floor fibers and the like may be incorporated by milling without substantial decomposition of the rubber hydrochloride when stabilizers are present. These materials, in addition to their use as fillers, and particularly the absorbent materials, appear to enhance the action of the liquid stabilizers.

Included in the products made from stabilized rubber halogen composition are coated sheets and objects. The stabilized plasticized composition is rolled on to paper or similar material in such a manner as to produce a composite wrapping sheet. By means of the heat and pressure due to the rolling, the rubber compound will be held tenaciously to the base sheet. However, preferably, the paper may be coated or impregnated with various resins, such as chlorinated diphenyls, which will aid in bonding the two sheets. The stabilized rubber halogen compound may also be rolled or pressed with fabric so as to incorporate it.

It is to be understood that the term "rubber" unless otherwise limited is employed in the appended claims in a generic sense to include natural rubber, synthetic rubber, reclaimed rubber, scrap rubber and like products. Under the term "halogenated and hydrohalogenated butadiene polymer bodies" are included chloride and hydrochlorides of gutta percha, balata, and Duprene. By amorphous material is meant material which is non crystalline by X-ray analysis. Amorphous materials show a typical ring image by X-ray photography. By the term "milling" is meant the mastication of an undisaggregated mass by mixing rolls or kneaders by means of which the mass is converted into a plastic state so that it may be changed in shape or incorporated with other materials without being first disaggregated by solvents. The mass may be dry or may contain insufficient solvents to bring about disaggregation. It is within the scope of the present invention, however, that stabilizers may be incorporated with the rubber hydrochloride by mixing in solution followed by evaporation of the solvents, but such is not the preferred method, and with inorganic stabilizers especially is apt to give non-homogeneous mixtures. However, by such methods it is possible to produce light colored substantially undecomposed molded products and rolled sheets superior to products made without stabilizers.

It is also within the bounds of this invention to mix powdered rubber hydrochloride with stabilizers and other materials, and then roll or mold the mixture into useful articles.

The milling of rubber hydrochloride without stabilizers to form integral masses may be done by milling at elevated temperatures of around 90° to 100° F. with, however, substantial decomposition of the compound. By the use of stabilizers such as magnesium oxide integral masses may be obtained even on a cold roll. By the use of plasticizers in regulated amounts it is possible to produce integral masses by milling, even though stabilizers are not present, but in the absence of stabilizers considerable decomposition and darkening of color results even at low temperatures. The use of too little plasticizer at low temperatures results in crumbling. When plasticizers are used it is of advantage to use the amorphous rubber hydrochloride since this material will be softened by much less plasticizer than the crystalline compound. Although, in general, unstabilized plasticized milled masses are too soft and dark they may be used for some purposes.

Numerous details of the process and composition may be varied through a wide range without departing from the principles of this invention and it is, therefore, not intended to limit the patent granted hereon otherwise than necessitated by the prior art.

The amount of stabilizer required to retard heat disintegration of a halogen containing rubber derivatives varies as has been heretofore pointed out, according to the kind of stabilizer. With rubber hydrochloride and magnesium oxide the heat disintegration due to milling is appreciably retarded when the amount of magnesium oxide stabilizer is as low as two parts per 100 parts of rubber hydrochloride by weight. With calcium oxide as a heat stabilizer the proportion used should be higher or the calcium oxide used in conjunction with other stabilizers such as hexamethylene tetramine so that the total amount of stabilizer present is, for example, around 5 parts or more by weight. With other heat stabilizers such as hexamethylene tetramine, lead oxide, sodium carbonate, the amount used for good results should be considerably higher than for magnesium oxide as, for example, 10 parts or more of stabilizer per 100 parts of rubber hydrochloride by weight. The stabilizing ability of the various stabilizing materials in small amounts is shown particularly in Tables I and II, and the specification also points out the effect of increasing the amounts of many of the stabilizers.

What I claim is:

1. The method of making a homogeneous thermoplastic composition adapted for molding, calendering and the like, which comprises milling a halogen containing rubber derivative with a basic substance of such character and in such amount as to retard heat disintegration of the halogen containing rubber derivative.

2. The method of making a homogeneous thermoplastic composition adapted for molding, calendering and the like, which comprises milling a rubber hydrohalide with a basic substance of such character and in such amount as to retard heat disintegration of the rubber hydrohalide.

3. The method of making a homogeneous thermoplastic composition adapted for molding, calendering and the like, which comprises milling a rubber hydrohalide with an inorganic basic substance of such character and in such amount as to retard heat disintegration of the rubber hydrohalide.

4. The method of making a homogeneous, thermoplastic composition, adapted for molding, calendering and the like, which comprises milling a rubber hydrochloride with a substance from the group consisting of basic magnesium compounds, basic alkali earth metal compounds, basic alkali metal compounds, basic lead compounds and amines.

5. The method of making a homogeneous, thermoplastic composition adapted for molding, calendering and the like, which comprises milling a rubber hydrochloride with magnesium oxide.

6. The method of making a homogeneous, thermoplastic composition adapted for molding, calendering and the like, which comprises milling a rubber hydrochloride with calcium oxide.

7. The method of making a homogeneous, thermoplastic composition adapted for molding, calendering and the like which comprises milling a rubber hydrochloride with hexamethylene tetramine.

8. The method of making a thin sheet, suitable for wrapping purposes which comprises calendering into thin sheet form a mixture of a halogen containing rubber derivative and a basic substance of such character and in such amount as to retard heat disintegration of the rubber hydrochloride.

9. The method of making a thin sheet suitable for wrapping purposes which comprises calendering into thin sheet form a mixture of a rubber hydrochloride and a basic substance of such character and in such amount as to retard heat disintegration of the rubber hydrochloride.

10. The method of making a thin sheet suitable for wrapping purposes which comprises calendering into thin sheet form a mixture of a rubber hydrochloride and magnesium oxide.

11. The method of making a thin sheet suitable for wrapping purposes, which comprises calendering into thin sheet form a mixture of a rubber hydrochloride and calcium oxide.

12. The method of making a thin sheet suitable for wrapping purposes, which comprises calendering into thin sheet form a mixture of a rubber hydrochloride and hexamethylene tetramine.

13. The method of making molded articles of manufacture which comprises subjecting a substantially solid mixture of a halogen containing rubber derivative and magnesium oxide to heat and pressure sufficient to flow the solid mixture into shape.

14. The method of making molded and like formed products which comprises subjecting to heat and pressure sufficient to flow into shaped articles a substantially solid mixture of a rubber hydrohalide and a basic substance of such character and such amount as to retard the heat disintegration of the rubber hydrohalide.

15. The method of making molded and like formed products which comprises subjecting a substantially solid mixture of a rubber hydrohalide and a basic substance from the group consisting of basic magnesium compounds, basic alkali earth metal compounds, basic alkali metal compounds, basic lead compounds and amines to heat and pressure sufficient to flow the solid mixture into shape.

16. The method of making molded and like formed products which comprises subjecting a substantially solid mixture of rubber hydrochloride and magnesium oxide to heat and pressure sufficient to flow the solid mixture into shape.

17. The product obtained in accordance with the process substantially as defined in claim 14.

18. The product obtained in accordance with the process substantially as defined in claim 15, in which the selected basic substance is a basic inorganic compound.

19. A homogeneous composition comprising a milled rubber hydrohalide and magnesium oxide.

HERBERT A. WINKELMANN.